United States Patent [19]

Eaves

[11] Patent Number: 4,586,798

[45] Date of Patent: May 6, 1986

[54] PHOTOGRAPHIC SLIDE ASSEMBLY AND PROJECTOR

[76] Inventor: Robert R. Eaves, 1395 Varnum Dr., Wayne, Pa. 19087

[21] Appl. No.: 661,114

[22] Filed: Oct. 15, 1984

Related U.S. Application Data

[63] Continuation-in-part of Ser. No. 550,191, Nov. 9, 1983, abandoned.

[51] Int. Cl.⁴ ............................................. G03B 21/00
[52] U.S. Cl. .................................... 353/120; 353/122; 353/46; 353/111
[58] Field of Search ................ 353/120, 121, 122, 46, 353/47, 111, 112, 116; 40/436, 437, 488

[56] References Cited

U.S. PATENT DOCUMENTS

| | | |
|---|---|---|
| 1,066,765 | 7/1913 | Spiegel . |
| 2,058,581 | 10/1936 | Fegan . |
| 2,287,003 | 6/1942 | Proctor et al. . |
| 3,159,936 | 12/1964 | Musaphia . |
| 3,235,987 | 2/1966 | Yates . |
| 3,827,797 | 8/1974 | Eaves . |
| 4,165,161 | 8/1979 | Kramer . |

Primary Examiner—Harry N. Haroian

[57] ABSTRACT

A photographic slide assembly comprises a transparency and an activator sheet which are relatively movable. The transparency has an illusion-of-motion dot pattern thereon in an image defining area or areas and the activator sheet has an illusion-of-motion dot pattern thereon which is operationally complementary to the motion pattern of the slide transparency. The activator sheet is supported adjacent to the slide transparency so that the motion pattern of the activator sheet and the slide transparency fall within the field of focus of a slide projector lens when the slide assembly is operationally mounted within the projector.

23 Claims, 10 Drawing Figures

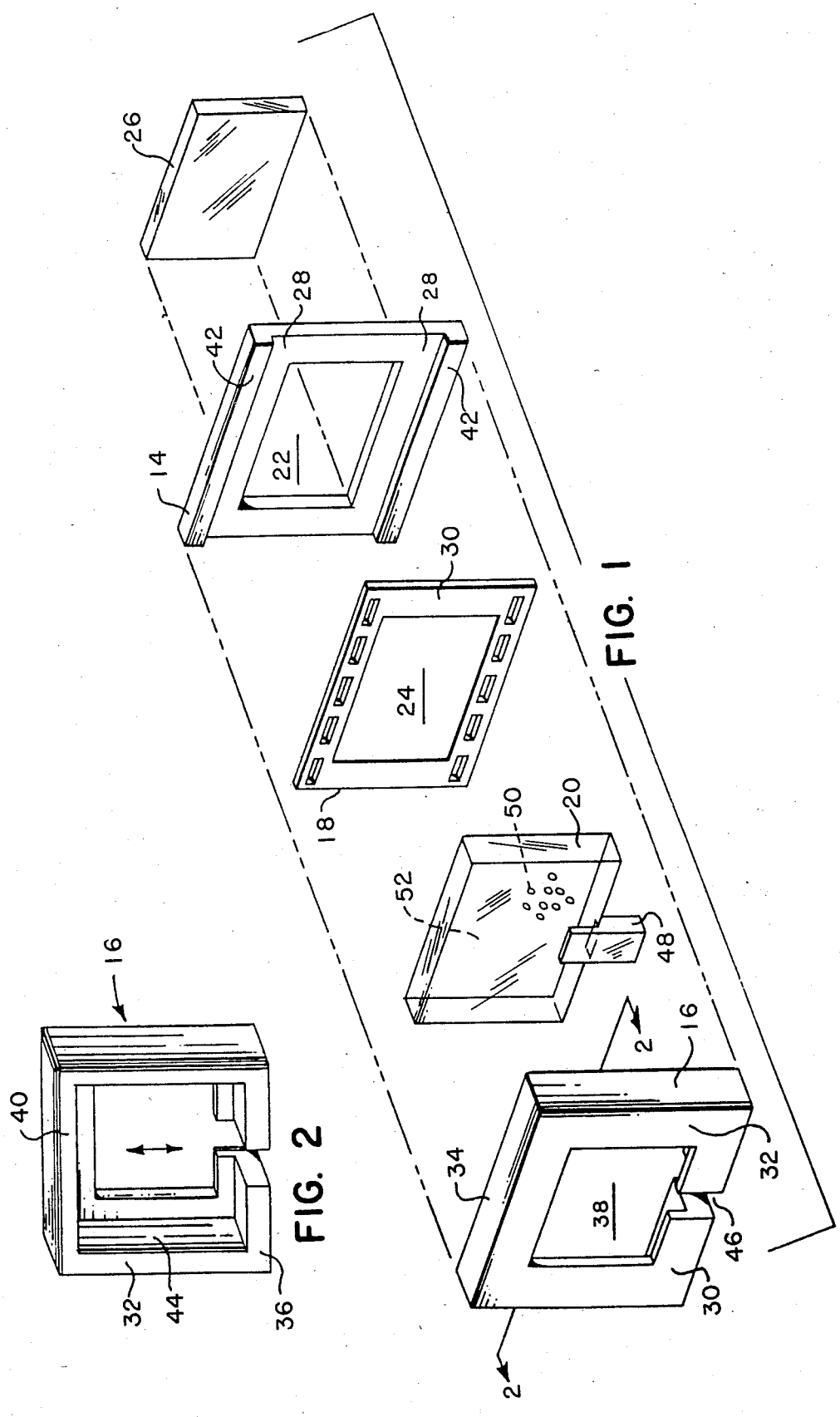

PHOTOGRAPHIC SLIDE ASSEMBLY AND PROJECTOR

CROSS-REFERENCE TO RELATED APPLICATION

This application is a continuation-in-part of application Ser. No. 550,191 filed Nov. 9, 1983, now abandoned.

BACKGROUND OF THE INVENTION

This invention relates to the creation of an illusion of motion employing standard size photographic slide transparencies and more particularly to a photographic slide assembly which may be utilized to project images having an illusion of motion and to a projection system use therewith.

Photographic slide projectors, such as the standard gravity fed 35 mm. carrousel-type projector, have been known for many years and are utilized to project stationary images on a screen from photographic slide transparencies. While various techniques have been utilized in other areas for producing illusions of motion through the use of polarization and moire patterning, these prior techniques have not been adaptable to conventional photographic slide projection.

In U.S. Pat. Nos. 3,643,361 and 3,811,213 issued to the present applicant, apparatus and methods for the creation of an illusion of motion by moire patterning are disclosed. In U.S. Pat. No. 3,827,797, also to the present applicant, an adapter or attachment mechanism is disclosed for use in standard overhead projectors for creating an illusion of motion with the use of dot pattern transparencies. In prior devices such as that shown in U.S. Pat. No. 3,827,797, an activator sheet carrying a dot pattern is mounted to the display device independent of the removable and changeable transparencies which comprise a cooperating "art sheet".

SUMMARY OF THE INVENTION

The present invention provides a unique photographic slide assembly comprising an "art sheet" in the form of a photographic slide transparency and an activator sheet. The activator sheet is positioned adjacent to the image area of the photographic slide transparency. The photographic slide transparency will have an illusion-of-motion pattern thereon and the activator sheet will have an illusion-of-motion pattern thereon which is operationally complementary to the motion pattern of the slide transparency. The transparency and activator sheet are relatively movable. Typically, the activator sheet is slideably mounted for oscillatory movement in a predetermined path relative to the slide transparency. The activator sheet and the slide transparency fall within the depth of focus at the focal plane of the photographic slide projector lens. Accordingly, an illusion of motion will be created when the image on the slide transparency is projected with a photographic slide projector and the activator sheet is moved in the predetermined path. The activator sheet is adapted for manual movement or automatic mechanical movement by a photographic slide projector having a mechanical adaptor assembly for imparting oscillatory motion to the activator sheet.

It is, accordingly, an object of the present invention to provide a photographic slide assembly for attaining an illusion of motion with a standard photographic slide projector without necessitating modification of the projector.

It is a further object of the invention to provide a photographic slide assembly and projector which attains an animated display while permitting projection of both animated and standard slide transparencies.

It is also an object of the invention to provide a photographic slide assembly which is capable of creating an illusion of motion and which can be intermixed in any order with standard slide transparencies in a standard slide tray.

BRIEF DESCRIPTION OF THE DRAWINGS

The present invention may be better understood and its numerous objects and advantages will become obvious to those skilled in the art by reference to the accompanying drawing wherein like reference numerals refer to like elements in the several FIGURES and in which:

FIG. 1 is an exploded perspective view of a photographic slide assembly in accordance with the present invention;

FIG. 2 is a perspective view, taken along line 2—2, of the slide assembly of FIG. 1;

DESCRIPTION OF THE DISCLOSED EMBODIMENTS

Figure 4:
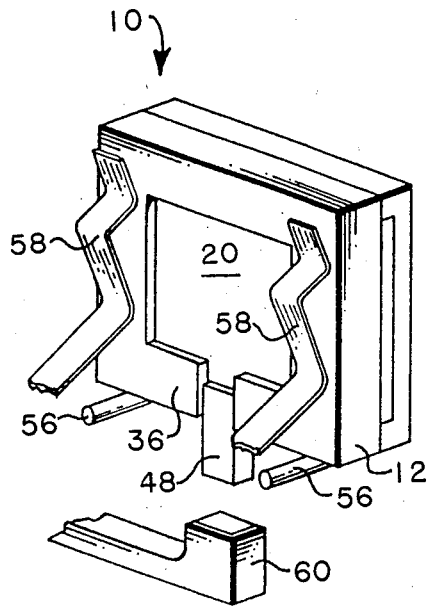
FIG. 4 is an enlarged perspective view of the slide assembly and a portion of the projector of FIG. 3.

Referring to the drawing, an animated photographic slide assembly in accordance with a first embodiment of the present invention is generally designated by the numeral 10 and is shown in an exploded view in FIG. 1.

The animated slide assembly 10 comprises a support frame 12 (FIG. 4) which is defined by forward frame member 14 and a rear frame member 16. Assembly 10 also comprises a photographic slide 18 and an activator sheet 20. The support frame 12 functions to rigidly support the slide 18 and to movably support the activator sheet 20 for sliding oscillatory movement in a predetermined path relative to the adjacently mounted slide 18.

The forward frame member 14 defines a light transmitting center section 22 corresponding to the image area 24 of the slide 18. Image area 24 will comprise a photographic film transparency and will function as an "art sheet". A transparent glass insert 26 is preferably supported in forward frame member 14 in registration with the center section 22 to provide planar stability to the slide 18. The slide 18 is mounted within a recess 28 defined in the rearwardly facing side of the forward frame member 14 by a pair of ribs 42 so that the emulsion side 30 of the film comprising the image area 24 faces rearwardly toward the activator sheet 20. The slide 18 is affixed to the forward frame member by adhesive material and overlies the glass insert 26.

The rear frame member 16 comprises opposed vertical sides 32, an upper end 34, and a lower end 36 which together define a light transmitting center section 38. In assembling the support frame 12, the forwardly facing surface 40 of rear frame member 16 is connected to the rearwardly facing surfaces of ribs 42 of the forward frame member 14 so that the center section 38 is in alignment with the center section 22.

Referring to FIG. 2, the vertical sides 32 of frame member 16 about center section or opening 38 are recessed, at the side which faces frame member 14, to define a housing 44 for slidably mounting the activator sheet 20 in alignment with the center section 22 of the forward frame member 14. The housing 44 is dimensioned and configured to guide the activator sheet 20 for sliding oscillatory movement between stop surfaces defined by the upper end 34 and the lower end 36 in a restricted predetermined path parallel and adjacent to the slide 18. As will be explained subsequently, the movement of the activator sheet 20 in a predetermined path relative to the slide 18 will create an illusion of motion when the image defined by the transparency is projected by a photographic slide projector.

The lower end 36 of the rearward frame member 16 contains a slot or channel 46 which recives a downwardly extending lift tab 48 of the activator sheet 20 as best shown in FIG. 4. In the configuration of FIG. 4, an upward lifting force on lift tab 48 will slide the activator sheet 20 upward in the housing 44 toward uper end 34 while the force of gravity is sufficient to subsequently return the activator sheet to its normal position at the lower end 36. As will be shown hereinafter, this configuration has particular utility in gravity-fed slide projector systems.

For effecting a projected illusion of motion, the activator sheet 20 includes an illusion of motion pattern thereon complementary to the illusion of motion pattern on the art sheet, i.e., the film transparency portion 24 of slide 18. Motion illusion is created with the present invention by application of the techniques and teachings of U.S. Pat. Nos. 3,643,361 and 3,811,213 which are incorporated herein by reference and which teach the creation of an illusion of motion by the use of relatively movable dot patterned sheets. One of the sheets is of uniform dot pattern, i.e., the activator sheet, and the other sheet is of differing dot patterns and has art work or information or displays of various kinds thereon, i.e., the art sheet. The activator sheet 20 of the present invention corresponds to the activator sheet as described in the referenced patents and the image area 24 of slide 18 corresponds to the art sheet having sections of differing dot patterns.

Motion illusion is created by relative motion of the activator sheet 20 with respect to the slide 18 while passing light therethrough to project the image carried by the slide 18 upon a projection screen. The desired oscillatory movement of the activator sheet 20 can be accomplished either manually or automatically by applying a motion inducing force to the tab 48.

Referring to FIG. 1, the dot pattern 50 of the activator sheet 20 is positioned on the forward facing surface 52 of the activator sheet which is parallel (and preferably as close as practical) to the emulsion surface 30 of the transparency or film which defines image area 24 of slide 18. When the slide assembly 10 is operationally mounted in a slide projector, the dot pattern 50 and the image surface of the slide 18 having the complementary dot pattern thereon (not shown) are both within the limited depth of focus at the focal plane of the projector lens.

Preferably, the activator sheet 20 is comprised of an optically clear material having a very low temperature coefficient of expansion, such as glass, to avoid deformation of the sheet due to heat generated in the slide projector. Deformation of the sheet can detrimentally affect the formation of the desired moire patterns. The dot pattern 50 upon the activator sheet 20 is preferably comprised of a reflecting metal such as aluminum or silver in order to limit heat generation since the film base of the slide 18 is also subject to temperature distortion.

Figure 3:
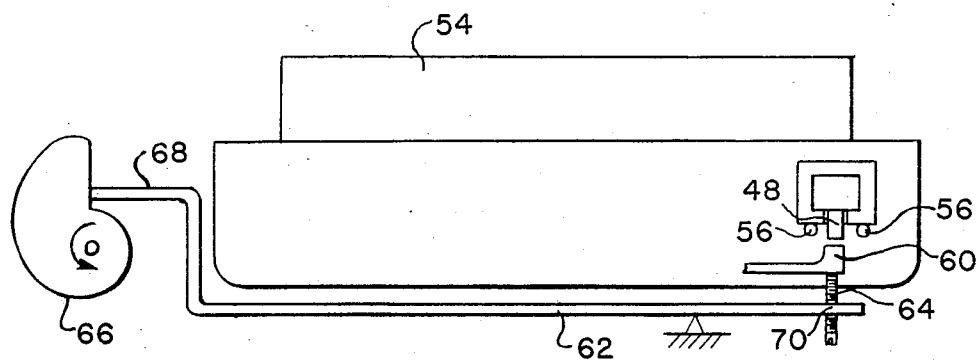
FIG. 3 is a diagrammatic view of an photographic slide assembly in accordance with the present invention supported within a photographic slide projector.

An animated slide assembly in accordance with the present invention can be utilized in a standard slide projector without necessitating modification of the projector by configuring the tab 48 for manually accessible oscillation. The illustrated embodiments have particular utility in a gravity-fed projector 54, diagramatically shown in FIGS. 3 and 4, which is provided with an adaptor which causes automatic oscillation of the activator sheet 20.

The projector 54 utilizes the force of gravity to feed an individual slide assembly from a tray or carrousel to the desired operational projection postion. In the projection position, the slide 10 is vertically supported on support pins 56 and horizontally secured by spring tabs 58 in a conventional manner. The projector ejection bar 60 functions to eject the individual slide out of the projection position to return it to the slide tray or carrousel after projection.

To selectively oscillate the activator sheet 20, a pivotally mounted lift bar 62 is employed to impart vertical motion through the ejection bar 60 to the lift tab 48. The lift bar 62 is mounted below the ejection bar 60 and has a contact screw 64 which may be adjusted so as to engage the lift bar 60 below the lift tab 48. A cam 66 is actuatable by a motor or the like to selectively raise and lower the lift bar 62, and thus also the ejection bar 60, to thereby oscillate the activator sheet 20 to produce an illusion of motion. More specifically, the motor driven cam 66 functions to raise and then allow the descent of the actuating end 68 of the lift bar 62. The lift end 70 of the lift bar 62 thus causes the activator sheet 20 to be lifted and then allowed to fall back to its initial position. The cam 66 is configured to drop the lift bar 62 in the position shown in FIG. 3 and thereby suddenly lift the activator sheet 20. As the cam turns, the lift bar 62 gradually lowers the activator sheet 20 to produce the desired animated motion in accordance with the teachings of U.S. Pat. Nos. 3,643,361 and 3,811,213. Alternatively, lift bar 62 may be manually pivoted to produce oscillation. As can be appreciated, a wide variety of manually and automatic actuated mechanisms can be utilized to deliver a motion inducing force to the lift tab 48.

In operation, the animated slide assembly 10 is placed in a standard carrousel or slide tray and may be intermixerd in any order with standard photographic slides. During the normal operation of the slide projector, each slide will sequentially be delivered into the projection position. When an animated slide assembly 10 is gravity-fed into the projection position, the lift bar 62 causes the activator sheet to oscillate an create an illusion of motion in the projected image. Since the path of oscillation of the actuator sheet is relatively short, the pivotal movement of the lift bar 62 does not effect a standard slide in the projection position. The contact screw 64 is adjustable so as to maintain the proper engagement with the ejection bar 60. After projection of the slide, the ejection bar 60 then removes the slide assembly in the customary manner for loading of the next adjacent slide.

Referring now to FIGS. 5–10, the preferred embodiment of a slide assembly in accordance with the present invention is shown. The embodiment of FIGS. 5–10 differs from the embodiment described above primarily by virtue of a less complicated construction and in the fact that the activator sheet is spring biased to insure that there will be adequate restoring force to return the sheet to an initial position when the actuating end 68 of the lift bar 62 "falls" off cam 66.

Figure 5:
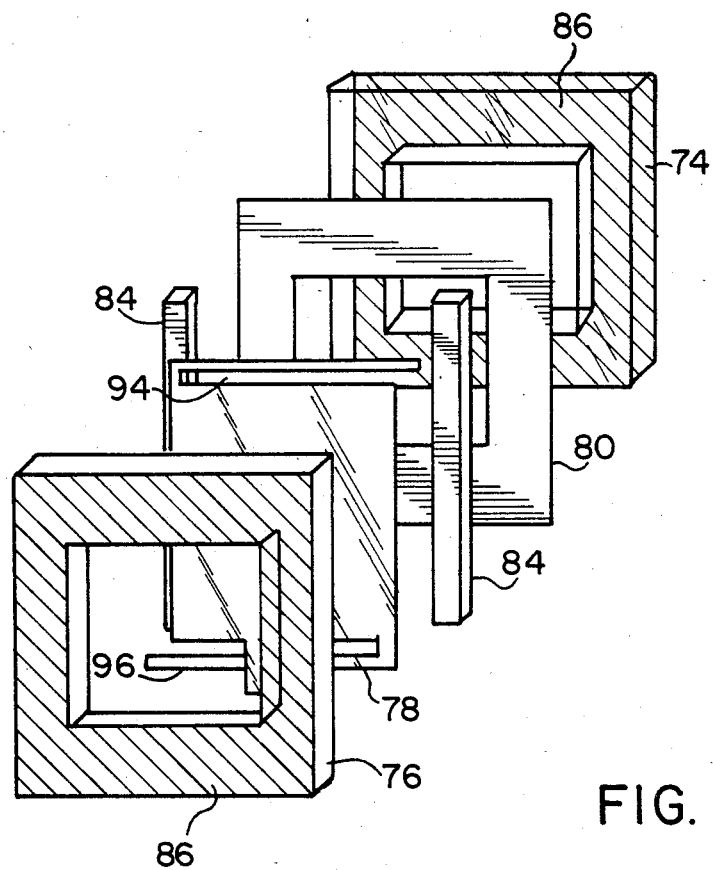
FIG. 5 is an exploded perspective view of a slide assembly in accordance with another embodiment of the present invention.
Figure 6:
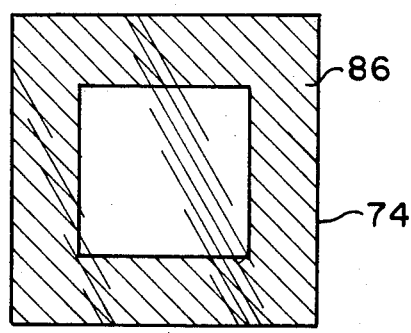
FIGS. 6–10 are front elevation views of the components of the slide assembly of FIG. 5.
Figure 7:
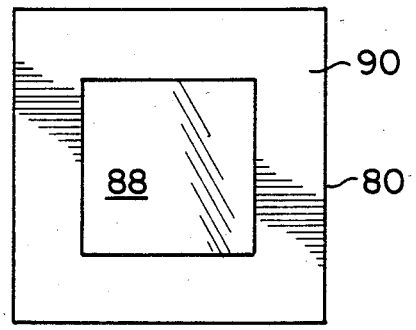
Figure 8:
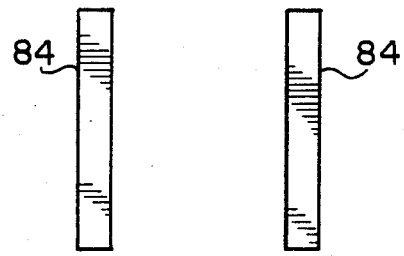
Figure 9:
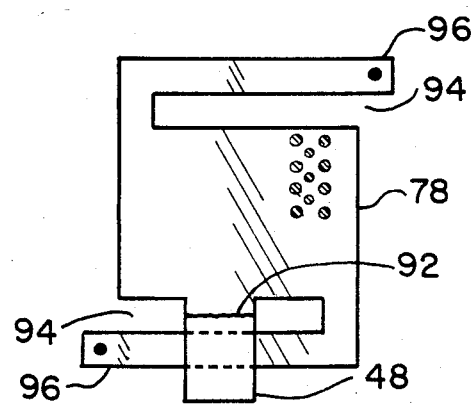
Figure 10:
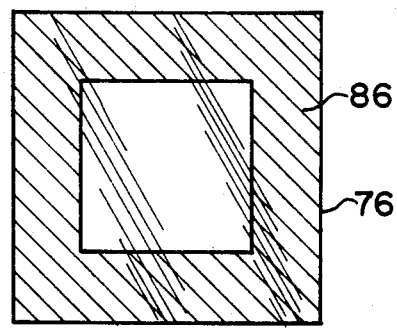

Continuing to refer to FIGS. 5–10, the slide assembly is indicated generally at 73 and comprises a sandwich defined by a pair of rectangular glass plates 74, 76 which may be seen from FIG. 5 and which are respectively shown in FIGS. 6 and 10, and a pair of spacers 84. An activator sheet 78 and a slide transparency 80 are positioned between glass plates 74 and 76. The activator sheet is also shown in FIG. 9 while the slide transparency, which forms the photographic image to be animated, may also be seen from FIG. 7. The spacers 84 may be seen from both of FIGS. 5 and 8.

The glass plates 74 and 76 are provided with rectangular shaped unobstructed image areas in the center thereof, these unobstructed image areas being in alignment in the assembled product. These image areas will be in registration with, and in fact entirely covered by, the dot pattern area of the activator sheet 78 regardless of the position of sheet 78. The peripheral regions of glass plates 74 and 76 will be covered with a layer of aluminum, as indicated at 86, to minimize heating by radiant energy. The aluminum coating may, for example, be applied by a silk screening technique.

The photographic image to be animated is printed in the central area 88 of the transparency or art sheet 80. The frame region 90 about the image area 88 will be comprised of unexposed positive film and thus will be black. In one reduction to practice of the invention the transparency 80 was comprised of No. 110 size "Ektachrome 64" film manufactured by Eastman Kodak Company. The area of transparency 80 must be much greater than the image area 88 so that free movement of the activator sheet 78 will not be obstructed by a curling edge of the transparency. Since there is a tendency for film to be deformed by exposure to the heat of projection, the transparency 80 is laminated to glass plate 74 through the use of a suitable adhesive. In one reduction to practice of the invention the adhesive was "Cyanoacrylate". In order to insure that the dots of the "art sheet", i.e., the image area of transparency 80, and the dots of the activator sheet 78 are spaced as closely as possible to a common plane, the emulsion side of the film comprising transparency 80 will be arranged to face the activator sheet 78.

As described above, the desired animation is achieved by imparting movement to the activator sheet 78 relative to the transparency 80 to thereby cause the dot screen of the activator sheet to oscillate in close proximity to the emulsion surface of transparency 80. In order to provide space for free movement of the activator sheet 78, the spacers 84 are adhesively bonded to the right and left edges of the transparency thus defining a pair of guide bars.

In one reduction to practice of the embodiment of FIGS. 5–10 the activator sheet 78 was comprised of a 0.002 inch thick sheet of transparent polyester. The spacers 84 were, in this reduction to practice, 0.0045 inches thick and therefore provided a clearance of 0.0025 inches for the activator sheet.

As may best be seen from FIG. 9, the lift tab 48 is adhesively bonded to the activator sheet along a bonding line which is indicated at 92. The activator sheet is provided with a pair of cut-outs 94 which, in part, define integral spring arms 96 which extend outwardly past the parallel side edges of sheet 78 as shown in FIG. 9. The polyester material from which the activator sheet 78 is fabricated has sufficient resiliency such that the flexing of the arms 96 resulting from the forcing of the lift tab 48 upwardly will result in the generation of a balanced restoring force which, when the mechanical force is removed from the lift tab, will cause the activator sheet to return to its initial position wherein the spring arms 96 are not distorted. Thus, in accordance with the present invention, the activator sheet 78 contains integral springs, i.e., sheet 78 functions as both the activator and a resilient biasing means.

During assembly, after the spacers 84 are in place, the activator sheet 78 is placed over the film 80 so that its screen surface, i.e., the aluminum dot pattern on the activator sheet 78, faces the emulsion surface of the film. The activator sheet will, at this time, be positioned between the spacers 84. The connection points T1 and T2, which are located adjacent the ends of the spring arms 96, are then adhesively bonded to the surface of the film 80 in the unexposed frame region 90 using a drop of "Cyanoacrylate" or other suitable adhesive.

Production of the slide assembly of FIGS. 5–10 is completed by adhesively bonding the glass plate 76 to the spacer strips 84. In one reduction to practice of the invention the lift tab 48, in the final assembly, projected 3/32 inches below the bottom edge of the aligned glass plates 74 and 76. In the same reduction to practice the activator sheet moved 1/16 inches during animation under the influence of the lift bar 62. However, during ejection of the animated slide assembly 73 from a projector the activator sheet 78 was pushed into the sandwich 3/32 inches.

As can be seen, the animated slide transparency of the present invention attains an animated display while permitting projection of both animated and standard slide transparencies that may be intermixed in any order in a standard slide tray. Moreover, the animated slide assembly is able to attain an illusion of motion on a standard photographic slide projector without necessitating modification of the projector. As will be apparent to persons skilled in the art, various modifications and adaptations of the structure above described will become readily apparent without departure from the spirit and scope of the invention, the scope of which is defined in the appended claims.

What is claimed is:

1. A photographic slide assembly including: transparency means, said transparency means comprising a photographic film having an emulsion side and an image area which includes an illusion-of-motion pattern;

an activator sheet having an illusion-of-motion pattern thereon which is operationally complementary to said motion pattern of said transparency means film, said motion pattern being printed on a first surface of said activator sheet;

means supporting said transparency means and said activator sheet so that said film and activator sheet lie in adjacent planes, said supporting means positioning said transparency means and activator sheet with their respective film emulsion side and the first surface in a facing relationship, said activator sheet being captured in said supporting means so as to be capable of limited motion in its support plane, said supporting means cooperating with said transparency means and activator sheet to define an integral slide assembly of generally rectangular shape, said supporting means including:
first plate means, said first plate means being at least partly transparent;
second plate means, said second plate means being at least partly transparent; and
spacer means disposed between said first and second plate means;
means for imparting substantially linear motion to said activator sheet whereby said activator sheet may be caused to more relative to said transparency means to thereby create an illusion-of-motion when said integral slide assembly is positioned within the slide receiving area of a photographic slide projector, said motion imparting means being affixed to said activator sheet and at least in part extending outwardly from said supporting means; and
means for resiliently biasing said activator sheet to a first position from which it is periodically moved by said motion imparting means, said biasing means contacting said activator sheet at least at two spacially displaced points, said biasing means causing return of said activator sheet to said first position after the displacement thereof from said first position by said motion imparting means.

2. The apparatus of claim 1 wherein said supporting means plate means are each comprised of glass and have an opaque frame region about the periphery thereof, said frame means defining windows at the opposite side of said supporting means, said windows being in registration with said transparency means film image area.

3. The apparatus of the claim 2 wherein said first and second plate means are each comprised of glass and have an opaque frame region which defines a window, said windows being in alignment and in registration with said transparency means film image area and wherein said spacer means defines a region for movement of said activator sheet.

4. The apparatus of claim 3 wherein said resilient biasing means comprises:
a pair of oppositely extending spring arms located at a pair of oppositely disposed edges of said activator sheet, said arms being oriented generally transverse to said direction of linear motion when said activator sheet is in said first position.

5. The apparatus of claim 4 wherein said transparency means film has a frame region surrounding said image area, a second side of said film which is opposite to said emulsion side being adhesively bonded in the frame region thereof to the opaque frame region of a first of said plates, and wherein said spring arms are adhesively bonded to the emulsion side of said film in the frame region thereof.

6. The apparatus of claim 5 wherein said motion imparting means comprises a tab extending from said activator sheet.

7. The apparatus of claim 1 wherein said activator sheet pattern is defined by dots comprised of reflective metal.

8. The apparatus of claim 7 wherein said activator sheet is disposed so as to be closer to a projection light source than said transparency means film.

9. The apparatus of claim 1 wherein said activator sheet pattern is defined by dots comprised of reflective metal, said dots being printed on first surface of said activator sheet.

10. The apparatus of claim 9 wherein said activator sheet is mounted in said supporting means so as to be positioned between a projection light source and said transparency means film.

11. The apparatus of claim 1 wherein said activator sheet is mounted in said supporting means so as to be positioned between a projection light source and said transparency means film.

12. Apparatus for animating projected images comprising:
transparency means, said transparency means comprising a photographic film having an emulsion side and including an image area which includes an illusion-of-motion pattern;
an activator sheet having an illusion-of-motion pattern thereof which is operationally complimentary to said motion pattern of said transparency means film, said motion pattern being printed on a first surface of said activator sheet;
means supporting said transparency means and said activator sheet so that said film and activator sheet lie in adjacent planes, said supporting means positioning said transparency means and activator sheet with their respective film emulsion side and the first surface in a facing relationship, said activator sheet being captured in said supporting means so as to be capable of limited motion in its support plane, said supporting means cooperating with said transparency means and activator sheet to define an integral slide assembly of generally rectangular shape, said supporting means including:
first plate means, said first plate means being at least partly transparent;
second plate means, said second plate means being at least partly transparent, said transparent parts of said plate means being in alignment and being in registration with said transparency means image area; and
spacer means disposed between said first and second plate means;
means for imparting substantially linear motion to said activator sheet whereby said activator sheet may be caused to more relative to said transparency means to thereby create an illusion-of-motion, said motion imparting means being affixed to said activator sheet and at least in part extending outwardly from said supporting means;
means for resiliently biasing said activator sheet to a first position from which it is moved by said motion imparting means, said biasing means contacting said activator sheet at least at two spacially displaced points, said biasing means causing return of said activator sheet to said first position after the displacement thereof from said first position by said motion imparting means;
gravity fed photographic slide projector means for projecting the image of said transparency means onto a projection screen via a lens and lamp arrangement, said projector means having an ejector bar which is movable to lift slide transparencies, said projector means including:
non-continuous platform means for supporting an individual photographic slide assembly in alignment with the lens of said projector means for projection of the image thereon; and means for imparting oscillatory motion to said ejector bar to cause said ejector bar to periodically deliver motion in a first direction to said slide assembly motion imparting means, the transmitted motion causing relative motion between said activator sheet and transparency means but being insufficient to lift a slide assembly from said platform means.

13. A photographic slide assembly including:

transparency means, said transparency means comprising a photographic film having an emulsion side with an image area which includes an illusion-of-motion pattern;

an activator sheet having an illusion-of-motion pattern which is complimentary to said motion pattern of said transparency means film on a first surface of said activator sheet;

means supporting said transparency means and said activator sheet so that said film and activator sheet lie in adjacent planes, said supporting means positioning the transparency means and activator sheet with their respective film emulsion side and first surface in a spaced apart facing relationship, said supporting means including:

first glass plate means, said first plate means having an opaque frame region about the periphery thereof, said frame region defining a transparent window in a central area of said first plate means, said transparency means being affixed to said first plate means with the image area thereof in registration with said window;

second glass plate means, said second plate means having an opaque frame region about the periphery thereof, said frame region defining a transparent window in a central region of said second plate means, the windows of said first and second plate means being in alignment with one another and being in registration with said transparency means film image area; and spacer means disposed between said first and second plate means and defining a region for movement of said activator sheet relative to said transparency means photographic film; and means for imparting motion to said activator sheet whereby said activator sheet may be caused to move relative to said transparency means to thereby create an illusion-of-motion when said integral slide assembly is positioned within the slide receiving area of a photographic slide projector and motion is imparted to said activator sheet, said motion imparting means being affixed to said activator sheet and at least in part extending outwardly, from said supporting means.

14. The apparatus of claim 13 wherein said motion imparting means includes:

spring means, said spring means biasing said activator sheet in a first direction.

15. The apparatus of claim 14 wherein said spring means is integral with said activator sheet and provides a restoring force to said activator sheet in a first direction of motion of said motion imparting means.

16. The apparatus of claim 15 wherein said spring means comprises:

at least a first spring arm, said first arm extending generally transverse to said first direction of motion in its normally unbiased state.

17. The apparatus of claim 16 wherein said transparency means film has a second side which is disposed oppositely with respect to said emulsion side and which is adhesively bonded to said supporting means, and wherein said spring arm is adhesively bonded to the emulsion side of said film.

18. The apparatus of claim 13 wherein said activator sheet pattern is defined by dots comprised of reflective metal, said dots being printed on first surface of said activator sheet.

19. The apparatus of claim 13 wherein said activator sheet is positioned between a projection light source and said transparency means film.

20. A photographic slide assembly including:

transparency means, said transparency means comprising a photographic film having an emulsion side with an image area which includes an illusion-of-motion pattern;

an activator sheet having an illusion-of-motion pattern on a first surface thereof, said activator sheet pattern being operationally complimentary to said illusion-of-motion pattern of said transparency means film;

means supporting said transparency means and said activator sheet so that said film and activator sheet lie in adjacent planes with their respective film emulsion side and first surface in facing relationship, said activator sheet being captured in said supporting means so as to be capable of generally linear limited motion in its support plane, said supporting means cooperating with said transparency means and activator sheet to define an integral slide assembly of generally rectangular shape, said supporting means including:

a forward frame member having forward and rearward portions and defining a light transmitting window commensurate in size and shape to the image area of said transparency means film; and a rear frame member connected to the rearward portion of said forward frame member and defining a light transmitting window in alignment with said window of said forward frame member, said rear frame member defining a housing for slidably mounting said activator sheet, said transparency means being fixedly secured to one of said frame members with said image area in registration with said windows;

means for imparting motion to said activator sheet whereby said activator sheet may be caused to move relative to said transparency means to thereby create an illusion-of-motion when said integral slide assembly is positioned within the slide receiving area of a photographic slide projector and motion is imparted to said activator sheet, said motion imparting means being affixed to said activator sheet and at least in part extending outwardly from said supporting means; and means for resiliently biasing said activator sheet to a first position from which it is moved by said motion imparting means, the resilient bias of said biasing means returning said activator sheet to said first position when said activator sheet is not moved out of said first position by said motion imparting means.

21. The apparatus of claim 20 wherein said rear frame member has opposing sides and upper and lower ends with said housing for mounting said activator sheet being in part defined by parallel recessed portions of said sides to restrict said activator sheet to linear oscillatory movement between said upper and lower ends.

22. The apparatus of claim 21 wherein said motion imparting means comprises a tab extending from said activator sheet, said tab passing through a recess in said rear frame member.

23. The apparatus of claim 20 wherein said activator sheet pattern is defined by dots comprised of reflective metal, said dots being printed on first surface of said activator sheet.

* * * * *